United States Patent [19]

Babel

[11] 4,378,621
[45] Apr. 5, 1983

[54] HEADSTOCK FOR A UNIVERSAL MILLING AND DRILLING MACHINE

[75] Inventor: Werner Babel, Pfronten-Meilingen, Fed. Rep. of Germany

[73] Assignee: Maho Werkzeugmaschinenbau Babel & Co., Pfronten, Fed. Rep. of Germany

[21] Appl. No.: 204,867

[22] Filed: Nov. 7, 1980

[30] Foreign Application Priority Data

Nov. 7, 1979 [DE] Fed. Rep. of Germany ....... 2944983

[51] Int. Cl.³ .................. B23Q 39/02; B23C 1/10
[52] U.S. Cl. .................. 29/26 A; 29/39;
29/48.5 A; 408/236; 409/144; 409/211;
409/213; 409/216
[58] Field of Search ......... 29/26 A, 26 R, 53, 55,
29/39, 48.5 A, 48.5 R; 409/201, 204, 215, 216,
217, 211, 241, 144, 235; 408/236, 35

[56] References Cited

U.S. PATENT DOCUMENTS

| 2,762,243 | 9/1956 | Knosp et al. | 408/236 |
| 2,949,063 | 8/1960 | Swanson et al. | 409/235 |
| 3,018,698 | 1/1962 | Lynch et al. | 409/144 |
| 3,295,415 | 1/1967 | Muller | 409/211 |
| 3,448,656 | 6/1969 | Bottger et al. | 409/215 |
| 4,069,741 | 1/1978 | Ewertowski | 408/35 X |

FOREIGN PATENT DOCUMENTS

| 1241231 | 5/1967 | Fed. Rep. of Germany | 409/230 |
| 2458399 | 6/1975 | Fed. Rep. of Germany | 29/26 A |
| 7524978 | 8/1975 | Fed. Rep. of Germany | 29/26 A |
| 2613736 | 10/1976 | Fed. Rep. of Germany | 409/211 |

OTHER PUBLICATIONS

R. Reeber, "Universal Tool-milling Machines", pp. 595-602, Werkst und Betrieb III (1978).

Primary Examiner—William R. Briggs
Attorney, Agent, or Firm—Brown & Martin

[57] ABSTRACT

A headstock for a universal milling and drilling machine. The headstock includes a horizontal spindle within the headstock housing. A swivel head to which a vertical milling head is mounted is rotatably mounted at a 45° angle on the headstock and is lockable in position by a locking mechanism.

4 Claims, 5 Drawing Figures

HEADSTOCK FOR A UNIVERSAL MILLING AND DRILLING MACHINE

FIELD OF THE INVENTION

This invention relates to milling and drilling machines, and in particular, to a rotatable headstock for use on milling and drilling machines.

BACKGROUND OF THE INVENTION

Universal milling and drilling machines are equipped, as a rule, with a horizontal spindle mounted in the headstock and a vertical milling head, the vertical head being mounted on the exposed face of the headstock. The horizontal spindle or the vertical spindle (when a vertical milling head is employed), as required, is driven by a common main drive through a reversing gearbox. In simpler machine tools, the vertical milling head is bolted onto the flat face of the headstock by hand as required. This type of installation prolongs the downtime of the machine tool, and the manual installation process rules out continuous machining procedures.

Headstocks are already known which, at least in part, obviate some of these disadvantages, wherein the vertical milling head is mounted on a separate plate and that plate is in turn mounted on the end of the headstock by an appropriate joint. After loosening the threaded bolts, which are still required, the vertical milling head is pivoted by a servo motor from an upper or lateral storage position into the endwise operating position, and vice versa. However, in this design, manually operable clamping bolts are still required to lock the vertical milling head to the end of the headstock. Moreover, the above embodiments suffer from the further disadvantage that dirt and chips, for example, can accumulate on the exposed surfaces, i.e., on the face of the headstock and on the corresponding surfaces of the vertical milling head, especially when the vertical milling head is in its stored position, since these two surfaces are then exposed.

A headstock is already known for a universal milling and drilling machine of the type mentioned above (see SHW Brochure UF 5), where a swivel head is mounted on the exposed end of the headstock, the swivel head being disposed so that it can rotate through 180° relative to the headstock, at a 45° upward angle with respect to the horizontal. This swivel head has the horizontal spindle on one end face, while a vertical milling head is screwed in the usual fashion onto the other end face. By rotating the swivel head about an axis of rotation that runs at right angles to the plane inclined at 45°, either the horizontal spindle or the vertical spindle can be brought into its working position. After one or the other working spindle has been positioned, a positive or non-positive connection to the output shaft of the main drive is made through a clutch. This headstock has an advantage over the designs described above in that the contact areas between the swivel head and the sloping surface of the headstock are always covered, so that the possibility of contamination of these areas is substantially reduced. Furthermore, positioning of one working spindle or the other is carried out without any manual work steps, so that the changeover from one type of working spindle to the other can be incorporated in a machining program.

However, the comparatively low rate of stock removal of the horizontal spindle is disadvantageous. Moreover, the horizontal spindle can be equipped with a spindle sleeve which can be extended only for a very limited distance, thus limiting machining capability. The machining area of this known headstock is further limited by the fact that the horizontal spindle is located relatively far above the guides of the headstock, and, when working with the horizontal spindle, the cylindrical extension of the housing of the vertical milling head is located immediately above this horizontal spindle, so that machining height is limited vertically. In addition, providing an accessory such as a holder-up, a measuring device or the like is not readily possible directly on such a swivel head.

Headstock designs are known, for example, from German Offenlegungsschriften No. 2,458,399 and 2,613,736, wherein a vertical milling head is mounted on a swivel head, the swivel head being mounted endwise on the headstock in a diagonal plane directed downward at 45°. The vertical spindle is driven by the gearbox output shaft through a bevel gear reversing gearbox of various design. The disadvantage of this arrangement is once again the space requirements arising from the short distance between the horizontal drive shaft for the vertical spindle head and the horizontal spindle.

SUMMARY OF THE INVENTION

A purpose of the present invention is to provide a headstock of the species described above, which permits high stock removal rates, especially for the horizontal spindle, and wherein a comparably large free machining area is available for working with the horizontal spindle, as with the vertical spindle, whereby precise and efficient locking of the swivel head in the working position is ensured.

In this invention a horizontal spindle, together with a horizontal drive shaft and a drive shaft of the vertical spindle, are all mounted parallel to the axis of a main shaft within a headstock housing. The vertical spindle consists of a vertical spindle drive and a headstock drive which can be coupled to one another, the first of which being mounted in a swivel head and the other being mounted in the headstock housing. The invention also includes a lock between the swivel head and the headstock housing having at least one clamp and one indexing device.

Particular advantages of the headstock designed according to the invention include the fact that there is only a short distance between the horizontal spindle and the headstock guide so that roughing at a high stock removal rate can be carried out with the horizontal spindle. In addition, working with the vertical spindle entails little or no raising of the level at which the tool engages the work piece.

Other advantages are that the previously conventional horizontal spindles with extending spindle sleeves can be used, that none of the parts of the vertical spindle that extend into the machining area are present when working with the horizontal spindle, that the 45° sloping areas are protected against contamination because they are always covered by the swivel head so that no manual cleaning operations are required, and that in addition to the vertical milling head, accessories can be mounted and driven on the remaining free area of the headstock, e.g., another tool head, a holder-up, a measuring device or the like.

DESCRIPTION OF THE DRAWING

The objects, advantages and features of this invention will be more readily appreciated from the following detailed description, when read in conjunction with the accompanying drawing, in which.

DETAILED DESCRIPTION OF THE DRAWING

Figure 1:
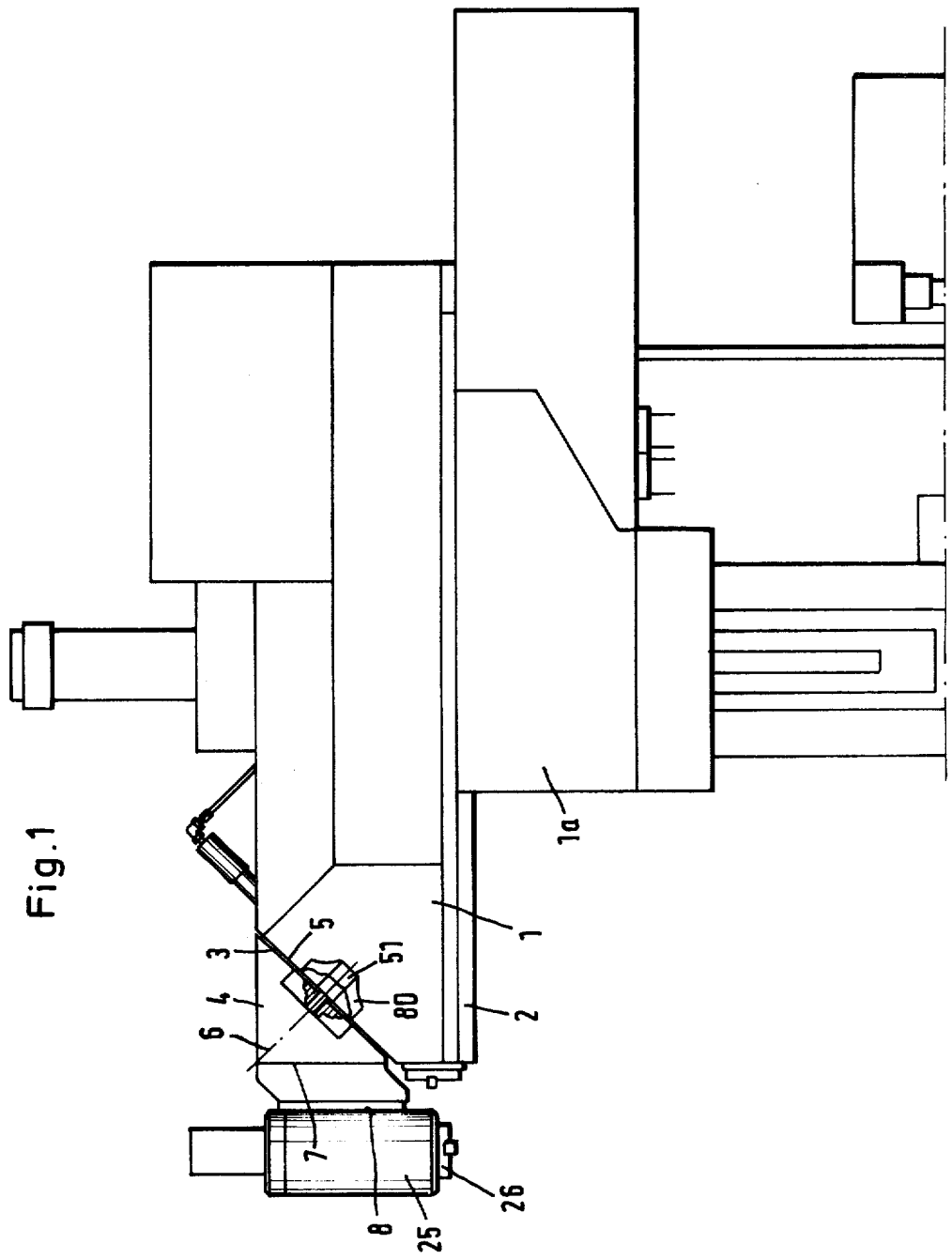
FIG. 1 is a side elevation of a universal milling and drilling machine showing a headstock constructed in accordance with the present invention, showing the vertical milling head in the working position.

With reference now to the drawing, and more particularly to FIG. 1 thereof, there is shown a headstock comprising a housing 1 mounted so as to be horizontally displaceable via horizontal swallow-tail-shaped tracks 2 on a pedestal 1a. The headstock could be mounted directly on the vertical machine pedestal by means of lateral tracks. At its free end, headstock housing 1 has a sloping surface 3 which is inclined at 45° to the vertical at its upper part, upon which sloping surface a swivel head 4 is rotatably mounted to the headstock housing by covered slide bearings (not shown) which are mounted about a diagonal central axis of rotation 6. Rotation axis 6 is oriented at 45° with respect to the vertical by means of a mounting surface 5 which is in a plane of rotation likewise inclined at 45° to the vertical (normal to axis 6) and is in parallel confronting relationship with surface 3. A conventional vertical milling head 25 is firmly mounted on end face 7, vertical in FIG. 1, of swivel head 4 by means of an intermediate plate 8.

Figure 2:
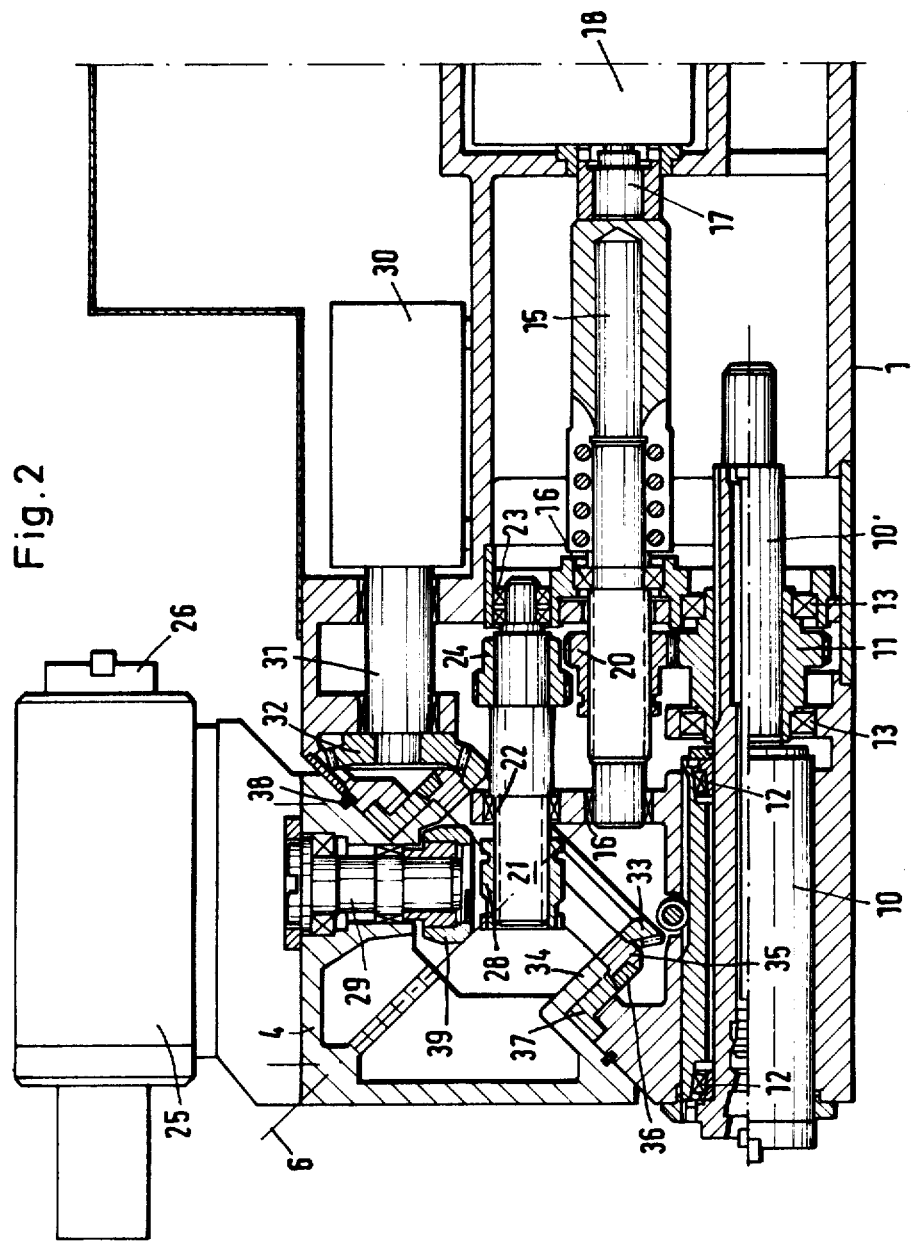
FIG. 2 is a vertical lengthwise section through the headstock, with the vertical milling head rotated into its storage position.
Figure 3:
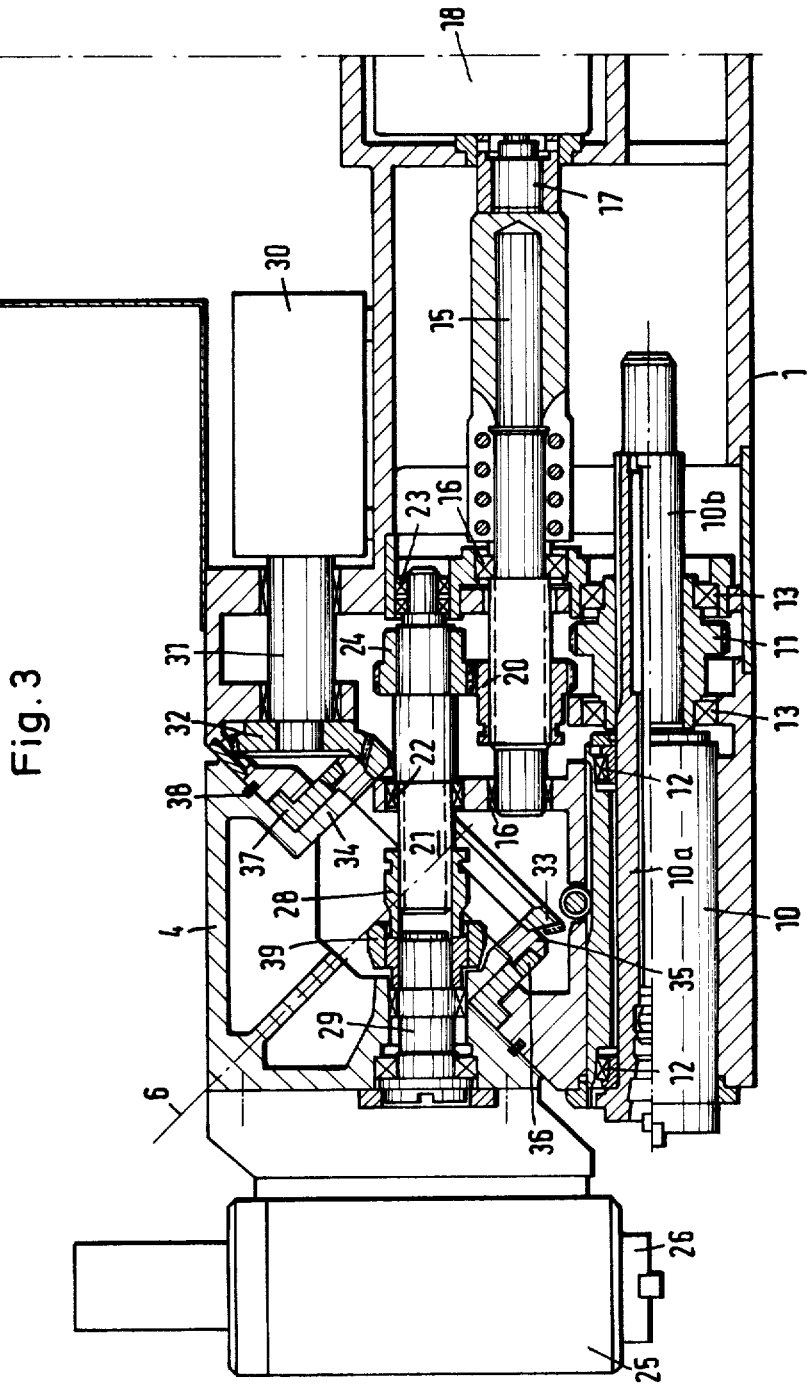
FIG. 3 is a view similar to FIG. 2, with the vertical milling head engaged and swung down into the working position.

As is shown particularly in FIGS. 2 and 3, a horizontal spindle 10 is mounted in an extendable spindle sleeve 10a by means of bearings 12 in the lower part of the headstock. A drive pinion 11 is mounted non-rotatably and relatively displaceably on drive shaft 10b of horizontal spindle 10, provided with a tool clamp, said pinion 11 being mounted in bearings 13 in headstock housing 1. A main shaft 15 is mounted above horizontal spindle 10 and parallel to its axis, in slide or roller bearings 16, the rearward end of said shaft 15 being connected to drive shaft 17 of main drive 18 for rotation therewith. A sliding gearwheel 20 is non-rotatably and axially displaceably located on this main shaft 15, said gearwheel being displaceable by conventional shift forks into the engaged position shown in FIG. 2 or the engaged position shown in FIG. 3 on main shaft 15. A stub shaft 21, also called the headstock drive, is mounted above main shaft 15 and parallel to its axis in headstock housing 1, in roller or slide bearings 22 integral with the housing, with a drive pinion 24 fastened to stub shaft 21 by a key.

When swivel head 4 is in the storage position for vertical milling head 25 shown in FIG. 2, and machining is being done with the horizontal spindle 10, an appropriate displacement of sliding gearwheel 20 links main shaft 15 to horizontal spindle 10 through the radial teeth on sliding gearwheel 20 and drive pinion 11, while stub shaft 21, which constitutes a portion of the drive shaft for vertical spindle 26, is uncoupled from the drive train and consequently does not rotate therewith. This has the advantage from the machining standpoint that amount of heat caused by bearing friction generated in the forward part of the headstock is correspondingly reduced. A bushing 28 is mounted at the forward end of stub shaft 21, as part of an axially shiftable dog clutch.

Swivel head 4 is in the shape of a prism and carries vertical milling head 25 with vertical spindle 26 on the area at the top in FIG. 2. A short stub shaft 29, also called the vertical spindle drive, is rotatably mounted in swivel head 4 and is positionally displaceable by a rotational movement of swivel head 4 about diagonal central axis 6, from the storage position shown in FIG. 2 to the operating position shown in FIG. 3. A reversing swivel head rotation drive, which includes a hydraulically actuated servo motor 30, is firmly mounted in headstock housing 1 to execute this rotary movement. The drive shaft 31 of the motor is mounted in housing 1 and has a bevel gear 32 at its free end. This bevel gear 32 is constantly in mesh with a crown gear 33 with matching conical external teeth, the crown gear being attached to a hollow cylindrical extension 34 of swivel head 4 through an intermediate ring 35. An annular clamp 36, composed of a plurality of arcuate segments (elements 55, 56 in FIG. 5), engages a radial groove in intermediate ring 35. The clamp is capable of being actuated hydraulically or mechanically and presses with one of its sloping surfaces against a ring 37, which is integral with the housing, providing a high clamping force, in order to lock the swivel head 4 in one position or another relative to headstock housing 1, as shown in FIGS. 2 and 3. One or more O-ring seals 38 are provided to seal off the two facing inclined surfaces 3 and 5. A bushing 39 with internal teeth is mounted on shaft section 29 (vertical spindle drive) is swivel head 4, adapted to engage bushing 28 when in the operating position.

With respect to the headstock described, machining is accomplished as described below.

For machining processes using the horizontal spindle, e.g., for roughing, horizontal spindle 10 is driven by main drive 18, common shafts 17 and 15, and sliding gearwheel 20, which is in the position shown in FIG. 2, as well as drive pinion 11, which is in mesh with wheel 20. Vertical milling head 25 projects upward from the associated supporting surface of the swivel head, without any of its individual parts projecting into the machining area. As can be seen from FIG. 2, the free end of swivel head 4 vertically terminates coextensive with the end of the headstock, so that there is practically no impediment of work steps even with bulky workpieces. Its arrangement in the headstock permits horizontal spindle 10 to be mounted on an extendable spindle sleeve, thus increasing the range of the machining processes that can be carried out.

For working with vertical spindle 26, swivel head 4 is rotated from the position shown in FIG. 2 into the position shown in FIG. 3, around its diagonal central axis 6. Clamping ring 36 is released and drive 30 is actuated before the rotational movement. Swivel head 4 undergoes a half rotation by means of rotation of motor shaft 31, bevel gear 32, and beveled crown gear 33, whereby bevel gear 32 and crown gear 33 are situated so that the extensions of the lines of their teeth intersect at a point on central axis 6. By using a servo drive 30, driven by a pressure medium, effective damping of the rotational movement of swivel head 4 is accomplished as it reaches its corresponding end position. After swiveling or rotation of swivel head 4 through one half turn, the vertical milling head 25 is in the position shown in FIG. 3. Clamps 36 are applied and the locking bolts 51, shown in FIG. 1 and displaceably mounted in holders 80 mounted laterally on headstock housing 1, are forced into recesses, parallel to rotational axis 6, in the laterally projecting edge of swivel head 4. After swivel head 4 is locked into position, the two shaft segments 21 and 29, also known as the headstock drive the the vertical spindle drive respectively, are brought into mutual mesh by axial displacement of clutch sleeve 28. At the same time, sliding gearwheel 20 is moved from the right-hand position shown in FIG. 2 into the left-hand position shown in FIG. 3, whereby main shaft 15 is linked with shaft section 21.

After these shifting procedures, machining of the workpiece with vertical spindle 26 can begin. Since manual engagement is not necessary for any of these changeover processes, these processes can be completely integrated into programmed control of the machine tool and can proceed completely automatically.

Figure 4:
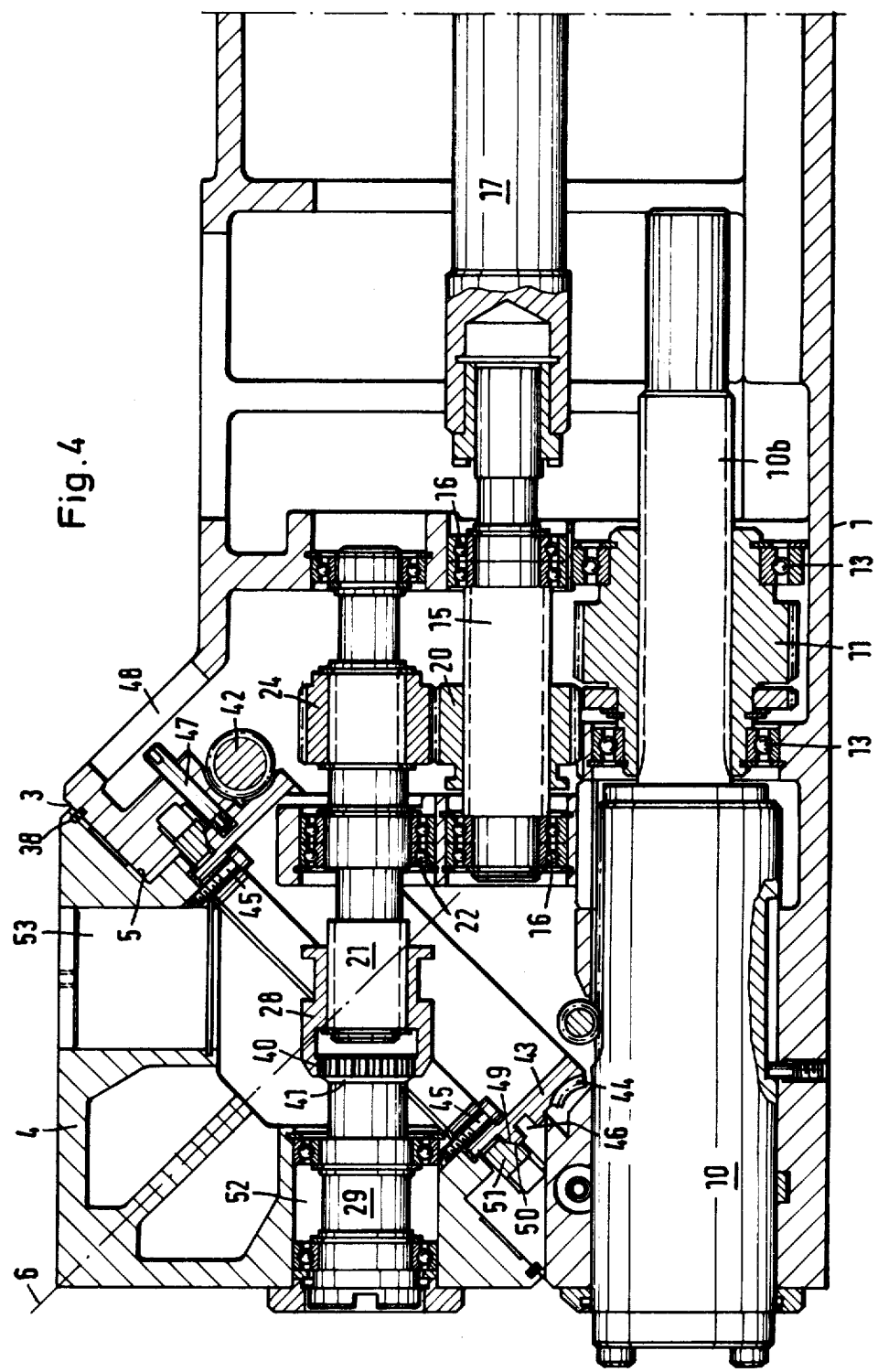
FIG. 4 is an alternative embodiment of the headstock, shown in vertical lengthwise section, with the vertical milling head removed.

The headstock design shown in FIG. 4 corresponds in its most important features to those shown in FIGS. 2 and 3. Horizontal spindle 10 is similarly mounted in the headstock beneath swivel head 4 and is equipped with an extendable spindle sleeve. A drive pinion 11 is keyed in a relatively displaceable manner to the drive shaft 10b of horizontal spindle 10 and is mounted in roller bearings 13 in headstock housing 1. Main shaft 15 is mounted in roller bearings 16 vertically above drive shaft 10b and horizontal spindle 10, the main shaft being permanently linked to the drive shaft 17 of the main drive. Sliding gearwheel 20 is mounted axially displaceably on this main shaft 15, the gearwheel, in the situation shown, being in mesh with the headstock drive pinion 24, permanently keyed to shaft segment 21 to drive the vertical spindle. In this design, clutch sleeve 28 is likewise keyed to the left-hand end of shaft segment 21 so that it is displaceable lengthwise by means of a shift fork which is not shown. The free end of clutch sleeve 28 is fitted with internal teeth which, according to FIG. 4, engage external teeth provided on an annular collar 41 on the right-hand end of shaft segment 29. Displacing clutch sleeve 28 separates the driving connection between shaft segments 21 and 29 intersecting generally on the axis 6, to allow rotation of swivel head 4, sleeve 28 moving out of the left-hand position shown into a right-hand position.

Rotation of the swivel head is accomplished in this design shown in FIG. 4 by means of a worm drive, whose worm 42 is driven by a motor, not shown, whereby worm wheel gearing 44 is provided on the outer circumference of a hollow cylinder 43 secured to swivel head 4 at the bottom by means of clamping screws 45. An annular groove 46, engaged by guide bolts 47, is provided above worm wheel gearing 44 on the outer edge of hollow cylinder 43. These guide bolts 47 serve for precise guidance of swivel head 4 during its rotary movement and have eccentrically mounted adjustable rollers on their engaging ends, said rollers running in the annular groove 46 of hollow cylinder 43 and preventing tilting when clamp 36 is released.

Figure 5:
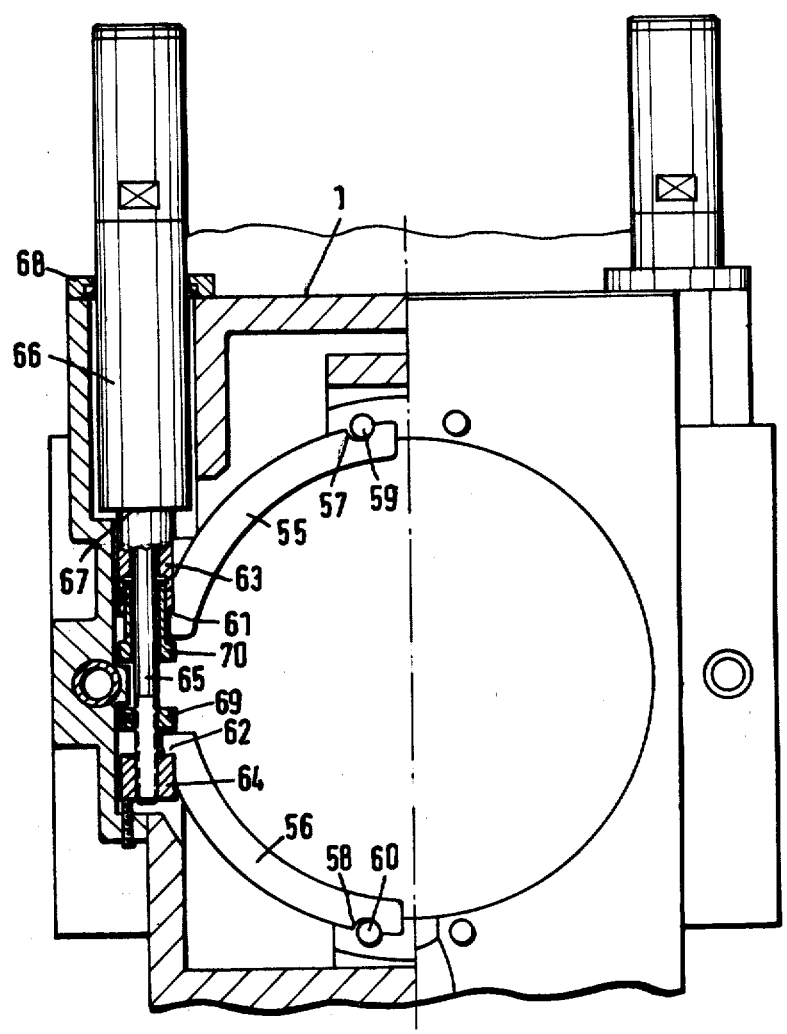
FIG. 5 is a partially cut-away top view of the clamping and locking device for the headstock of FIG. 4.

In its upper part, hollow cylinder 43 had a sloping surface 49 which cooperates with a correspondingly designed sloping surface 50 of clamp 36, composed of a plurality of arcuate segments (see FIG. 5). Each segment of clamp 36 has the cross section shown in FIG. 4 and is located at least partially in an annular groove in housing 1. The trapezoidal cross-sectional shape of clamp 36 shown in FIG. 4 causes the clamping surfaces 50 to press against the sloping surface 49 of hollow cylinder 43 to achieve a wedging action when clamping, by radially pulling together of the arcuate clamping segments. This wedging action produces a positive axial force, with which swivel head 4, with its inclined supporting surface 5, is pressed against the facing inclined surface 3 of headstock housing 1. The action of clamp 36 and the locking bolts 51, in conjunction with at least one guide bolt 47 which is parallel to the swivel head plane of rotation and engages swivel head 4 and headstock housing 1, produces an extremely accurate and very rigid positioning of the swivel head and the vertical milling head. Some of the above mentioned elements taken together describe an indexing device, these elements being the guide bolt 47, the eccentrically adjustable roller body at the free end of the guide bolt and circumferential groove 46 on the hollow cylindrical body 43 attached to said swivel head. A swivel head lock comprises locking bolts 51, lateral holders 80 mounted on the headstock housing 1 to retain the locking bolts, and at least one indexing bore in the swivel head to receive the locking bolt. The locking bolts are slidable inwardly parallel to the diagonal axis of rotation.

Another difference between this design and those shown in FIGS. 2 and 3 consists in the fact that a further recess 53 is provided in swivel head 4 at right angles to shaft section 29, its axis intersecting generally on the axis 6. This recess is adapted for mounting of accessories, such as measuring devices, rotationally driven grinding or slotting heads, or the like.

FIG. 5 shows the two locking bolts 51 and the clamping device used on the headstock shown in FIG. 4, in partially cut away top view, looking in the direction of rotational axis 6. This clamp consists of four identical arcuate segments with a trapezoidal cross section as shown in FIG. 4, with only the two left-hand segments 55 and 56 being shown in FIG. 5. Each respective segment has a round notch 57, 58 at one end, the notch forming a joint together with a fixed pin 59, 60 respectively. A hook-shaped notch 61, 62 is provided at the other free end of each respective segment 55, 56, which notches are engaged by appropriately shaped thrust-exerting elements 63, 64. Element 64 is mounted on piston rod 65 of a servo cylinder 66. Thrust-exerting element 63 is designed as a bushing whose free end is attached to the end 67 of the housing of servo cylinder 66.

Servo cylinder 66 itself is mounted axially displaceably in headstock housing 1 and is held by a sealing plate 68 bolted to the housing. When the servo is actuated, such as by applying pressure in a known manner, piston rod 65 and the cylinder housing simultaneously move toward one another, whereby uniform tensioning of both arcuate segments 55 and 56 is accomplished by thrust-exerting elements 63, 64, thus producing clamping of swivel head 4. A shoulder 69 to release arcuate segment 56 is mounted on piston rod 65, the shoulder swinging the free end of segment 56 radially outwardly as the piston rod is extended. To release segment 55, a shoulder 70 formed on bushing 63 is provided to press against the free end of segment 55 during a corresponding releasing movement of servo cylinder 66 thus swinging annular segment 55 radially outward about joint 57, 59. The arcuate segments which would appear on the right-side of FIG. 5, with their corresponding clamping and releasing system, have a structural design as well as function similar to those described above.

The headstock designs described have a number of advantages over known headstocks with pivotable vertical milling heads. Thus, for example, a conventional horizontal spindle may be used, ensuring high stock removal rates. The distance between the horizontal spindle and the vertical spindle, when the latter is in the working position is small, thus producing adequate machining freedom without excessive vertical machine dimensions. Both working spindles can be provided with a hydraulic tool clamp and can be mounted in an extendable spindle sleeve. The extensive sliding area of the swivel head 4 in the diagonal plane, as well as its hollow cylindrical area 43 in a corresponding recess in the headstock housing, produce extraordinarily precise rotational movements and a reliable distribution of the forces (resulting from the weight of the vertical milling head and caused by the machining action) into the headstock housing. Also the inclined sliding surfaces themselves are less likely to be contaminated, since they are normally wetted with a film of lubricant. The lubricant would also provide a damping action with regard to dynamic forces. An additional tool head, a holder-up, a measuring device, or the like, for additional machining processes can be mounted and also possibly driven on the exposed area of the swivel head. In addition, the swivel head may further comprise an accessory opening 53 to receive an accessory drive shaft along an accessory axis which is aligned and coupled to said headstock drive by rotation of the swivel head.

The axes of the drive shafts for the vertical spindle, the additional machining and measuring devices on the free swivel head surface, and the swivel axis of the swivel head itself intersect at a point which is below the 45° swivel plane. The additional machining and measuring devices can be engaged by the dog clutch after being swiveled into the working position, and thus be driven by main shaft 15. The swiveling movement can be accomplished either by a drive with hydraulic damping through bevel gears, or a worm wheel drive, whereby a crown gear with worm or bevel gearing has an extraordinarily large diameter, thus promoting a uniform and smooth movement. Of course, it is also possible to use compressed air or electric motors as drive motors for the swivel head. Finally, there is sufficient space for hydromechanical automatic tool clamping, which does not exist in known designs because of the arrangement of the horizontal spindle directly in the swivel head.

What is claimed is:

1. A universal milling and drilling machine headstock having a vertical front face, said headstock comprising:
   main drive means in said headstock,
   a horizontal spindle in said headstock extending through said front face;
   a first surface on said headstock facing upwardly at a 45° angle from and above said front face, said first surface having a central opening therethrough with a first axis normal to said first surface;
   a swivel head rotatably mounted to said headstock and having a second surface in confronting juxtaposition with said first surface, said swivel head being rotatable between a first position and a second position;
   a hollow cylindrical extension mounted to said swivel head and extending into said headstock through said opening coaxial with said first axis, said swivel head being rotatable about said first axis;
   clamping means coupled to said headstock and surrounding said cylindrical extension, said clamping means comprising at least two annular segments shaped and configured to engage a mating surface on said cylindrical extension to selectively prevent rotation of said swivel head with respect to said headstock;
   a vertical milling head mounted on said swivel head so that when said swivel head is in said first position, said vertical milling head is vertically adjacent said front face of said headstock, and when said swivel head is in said second position said front face is free of said vertical milling head;
   horizontal drive shaft means connected to said horizontal spindle;
   vertical drive shaft means comprising a first part mounted in said headstock parallel to said horizontal spindle and a second part mounted in said swivel head, said first and second parts being connectable when said swivel head is in said first position; and
   means for selectively coupling said main drive means to said horizontal and said vertical drive shaft means.

2. The headstock recited in claim 1 wherein said annular segments of said clamping means are pivotably mounted at one end thereof to said headstock, said cylindrical extension being formed with a sloping circumferential surface and said annular segments being formed with a mating inclined surface adapted to engage said sloping circumferential surface;
   said clamping means further comprising a common clamp drive means to pivot said annular segments radially inwardly to thereby engage said inclined and sloping surfaces to prevent rotation of said swivel head with respect to said headstock and to simultaneously pull said first and second surfaces tightly together.

3. The headstock recited in claim 1 or 2 and further comprising at least one guide bolt mounted to said headstock for longitudinal movement with respect thereto, the axis of said guide bolt being perpendicular to said first axis;
   said cylindrical extension being formed with an external annular groove;
   said guide bolt having an adjustable roller in one end thereof extending into said annular groove to thereby maintain said swivel head in precise alignment with respect to said headstock when said clamping means is released.

4. The headstock of claim 1 wherein said lock further comprises locking bolts and lateral holders mounted on said headstock housing to retain said locking bolts, and wherein said locking bolts are slidable inwardly toward said headstock housing parallel to said axis of rotation, said locking bolt being received by at least one indexing bore in said swivel head.

* * * * *